US011139708B2

(12) United States Patent
Tzeng

(10) Patent No.: US 11,139,708 B2
(45) Date of Patent: Oct. 5, 2021

(54) DEVICE FOR USE IN GENERATING ELECTRIC POWER AND BRAKING, KIT AND BRAKE UNIT OF SAME

(71) Applicant: Yuan-Kwei Tzeng, Miaoli County (TW)

(72) Inventor: Yuan-Kwei Tzeng, Miaoli County (TW)

(*) Notice: Subject to any disclaimer, the term of this patent is extended or adjusted under 35 U.S.C. 154(b) by 196 days.

(21) Appl. No.: 16/446,635

(22) Filed: Jun. 20, 2019

(65) Prior Publication Data
US 2020/0403470 A1    Dec. 24, 2020

(51) Int. Cl.
| H02K 1/28 | (2006.01) |
| H02K 7/00 | (2006.01) |
| H02K 7/10 | (2006.01) |
| H02K 7/18 | (2006.01) |
| H02K 7/102 | (2006.01) |

(52) U.S. Cl.
CPC .............. *H02K 1/28* (2013.01); *H02K 7/003* (2013.01); *H02K 7/006* (2013.01); *H02K 7/1008* (2013.01); *H02K 7/1861* (2013.01); *H02K 7/1021* (2013.01)

(58) Field of Classification Search
CPC .. H02K 7/00; H02K 7/10; H02K 7/18; H02K 7/106; H02K 1/28; H02K 7/1008; H02K 16/04; H02K 7/003; H02K 7/006; H02K 7/14; H02K 7/1861; H02K 7/1021
USPC ................................. 310/76, 77, 92, 93, 123
See application file for complete search history.

(56) References Cited

U.S. PATENT DOCUMENTS

| 6,208,048 | B1 * | 3/2001 | Deynet ................... B60T 8/368 310/71 |
| 10,020,720 | B2 * | 7/2018 | Diehl ...................... A63G 21/22 |
| 2002/0117861 | A1 * | 8/2002 | Kim ....................... H02K 21/021 290/54 |
| 2016/0218585 | A1 * | 7/2016 | Tzeng ..................... H02K 21/22 |
| 2017/0361899 | A1 * | 12/2017 | Kerschgens ............. B62M 6/65 |
| 2018/0066703 | A1 * | 3/2018 | Tzeng .................... H02K 1/146 |

* cited by examiner

*Primary Examiner* — Naishadh N Desai

(57) ABSTRACT

A device for use in generating electric power and braking, a kit and a brake unit of the same are provided. A brake body in the brake unit includes a plurality of brake blocks. The brake unit has an electromagnetic air gap which is adjustable and controllable in high precision. Therefore, the tolerance of the electromagnetic air gap between the brake unit and the wheel is made small, even without increasing the machining precision and costs of the brake unit, thereby enhancing resistance precision.

14 Claims, 14 Drawing Sheets

DEVICE FOR USE IN GENERATING ELECTRIC POWER AND BRAKING, KIT AND BRAKE UNIT OF SAME

BACKGROUND OF THE INVENTION

Field of the Invention

The present invention relates to an electric power generating device, and more particularly to the device for use in generating electric power and braking, kit and brake unit of same.

Description of the Prior Art

With reference to FIG. 1 for a conventional power generating device 1, a power generator unit 3 is provided for generating alternating current continuously by rotating a wheel 2, and a rectifier 4 is provided for converting the alternating current into direct current, and then the direct current is supplied to a control panel 5. However, the control panel 5 requires a small amount of electric power for operation, so that a high power resistor 6 is used to consume the remaining electric power, and thus causing an issue of wasting power.

In addition, the conventional power generating device 1 adopts magnets of the wheel 2 and serrated portions of the power generator unit 3 which are not configured in pairs to reduce the significance of cogging torques, and thus the distribution of the internal torques is not uniform and vibrations are produced in the rotation direction easily. Therefore, the power generating device 1 may be damaged easily and may produce electromagnetic noises.

Based on the principle of electromagnetic braking, the wheel body can be decelerated to achieve the braking effect. However, the coordination and control of the braking force often requires a high precision combination of components, which leads to high cost.

SUMMARY OF THE INVENTION

An objective of the present disclosure is to provide a brake unit having an adjustable electromagnetic air gap and an electric power generation and brake device having the brake unit.

Another objective of the present disclosure is to provide a brake unit being able to fulfill resistance precision because of having a high-precision electromagnetic air gap and an electric power generation and brake device having the brake unit.

To achieve the above and other objects, the present invention discloses a device for use in generating electric power and braking, comprising: a rotatable wheel disposed on a shaft, the wheel comprising an outer annular portion circumferentially disposed on a rim of the wheel, an inner annular portion concentric with the outer annular portion and disposed between the outer annular portion and the shaft, and a plurality of permanent magnets disposed on an inner surface of one of the outer annular portion and the inner annular portion; a stator unit comprising a stator body, a plurality of first serrated portions circumferentially disposed on an outer circumferential surface of the stator body and protruding radially outward, and a plurality of electric generating coils wound around the first serrated portions, wherein the first serrated portions oppose the permanent magnets; and a brake unit fixed to the stator unit and comprising a brake body concentric with the stator body, a plurality of second serrated portions circumferentially disposed on an outer circumferential surface of the brake body and protruding radially outward, and a plurality of brake coils wound around the second serrated portions, wherein the brake body comprises a plurality of brake blocks arranged in a circle.

In an embodiment, the plurality of brake blocks of the brake body is held together by a plurality of coupling elements and fixed to a frame of the stator unit, the frame having a plurality of coupling holes, the plurality of brake blocks having a plurality of limiting holes corresponding in position to the plurality of coupling holes, respectively, the limiting holes defining allowable displacements of the brake blocks relative to the shaft, respectively, the coupling elements being coupled to the coupling holes through the limiting holes, respectively, such that the brake blocks thus displaced are fixed in place.

In an embodiment, the brake blocks extend arcuately and have equal central angles relative to the shaft.

In an embodiment, the number of the second serrated portions corresponding in position to each said brake block is at least two.

In an embodiment, the brake body of the brake unit is disposed between the outer annular portion and the inner annular portion, whereas the stator body of the stator unit is disposed between the inner annular portion and the shaft and faces the permanent magnets disposed on an inner surface of the inner annular portion.

In an embodiment, a bottom surface of the wheel has a plurality of through holes from which ends of the coupling elements are exposed, respectively.

In an embodiment, the brake body of the brake unit is disposed between the inner annular portion and the shaft, whereas the stator body of the stator unit is disposed between the outer annular portion and the inner annular portion and faces the permanent magnets disposed on an inner surface of the outer annular portion.

In an embodiment, a bottom surface of the wheel has a plurality of through holes from which ends of the coupling elements are exposed, respectively.

To achieve the above and other objects, the present invention further discloses a brake unit, for braking a rotatable wheel disposed on a shaft, the wheel comprising a protruding ring structure extending axially and being concentric with the shaft, the brake unit comprising: a brake body comprising a plurality of brake blocks arranged in a circle; a plurality of second serrated portions disposed circumferentially on an outer circumferential surface of the brake body and protruding radially outward; and a plurality of brake coils each wound around the second serrated portions.

In an embodiment, the brake unit comprises a frame and a plurality of coupling elements, the frame having a plurality of coupling holes which the plurality of coupling elements is penetratingly fixed to, respectively, the brake blocks each having a plurality of limiting holes corresponding in position to the plurality of coupling holes, respectively, such that allowable displacements of the brake blocks relative to the shaft are defined, because the coupling elements are axially fixed in place and the limiting holes have a larger diameter than that of the coupling holes.

In an embodiment, the coupling elements are each coupled to the frame by screwing, but the limiting holes on the brake blocks are not coupled to the coupling elements, respectively, by screwing.

In an embodiment, after the coupling elements have been penetratingly disposed at the limiting holes, respectively, the coupling elements take up, axially, a maximum 97% of space of the limiting holes.

In an embodiment, the brake blocks extend arcuately and have equal central angles relative to the shaft.

In an embodiment, the number of the second serrated portions corresponding in position to each said brake block is at least two.

To achieve the above and other objects, the present invention further discloses a kit for a electric power generation and brake device, comprising: a wheel comprising a protruding ring structure extending axially and being concentric with a shaft; a brake unit comprising a brake body, a plurality of second serrated portions circumferentially disposed on an outer circumferential surface of the brake body and protruding radially outward, and a plurality of brake coils wound around the second serrated portions, wherein the brake body comprises a plurality of brake blocks arranged in a circle by a frame and a plurality of coupling elements; and a gap control jig comprising a plurality of extending plates extending axially and inserted between the protruding ring structure of the wheel and the brake unit, wherein the extending plates provide a position-limiting effect when the brake blocks not fastened in place by the coupling elements are capable of automatically adjusting their distance from the protruding ring structure under a magnetic force generated from the brake coils which electric current is passing through, wherein an electromagnetic air gap between the wheel and the brake unit attains a target size upon fastening the brake unit in place by the coupling elements, interruption of passage of electric current through the brake coils, and removal of the gap control jig.

In an embodiment, the target size of the electromagnetic air gap is defined by a thickness of the extending plates of the gap control jig.

Therefore, the tolerance of the size of the electromagnetic air gap between the brake unit and the wheel is made small, even without increasing the machining precision and costs of the brake unit, thereby enhancing resistance precision.

DETAILED DESCRIPTION OF THE INVENTION

Objectives, features, and advantages of the present disclosure are hereunder illustrated with specific embodiments, depicted with drawings, and described below.

Words, such as "a", "an" and "one", used herein are descriptive of the components, structures, portions, devices, and areas to not only facilitate illustration but also define generally the scope of the present disclosure. Therefore, unless otherwise specified expressly, the words must be interpreted to mean "one" or "at least one" and thereby describe a singular noun or a plural noun.

Words, such as "comprise", "include", "have" and any equivalent thereof, used herein are not restricted to elements disclosed herein. Instead, the words may be descriptive of any elements which are not expressly disclosed herein but are required for the components, structures, portions, devices, and areas.

Ordinal numbers, such as "first" and "second", used herein are intended to distinguish or correlate identical or similar components or structures and do not necessarily imply what order the components, structures, portions, or areas are in terms of space or time. It is understood that in some situations or arrangements the ordinal numbers may be swapped without affecting the effects of implementation of the present disclosure.

Figure 2:
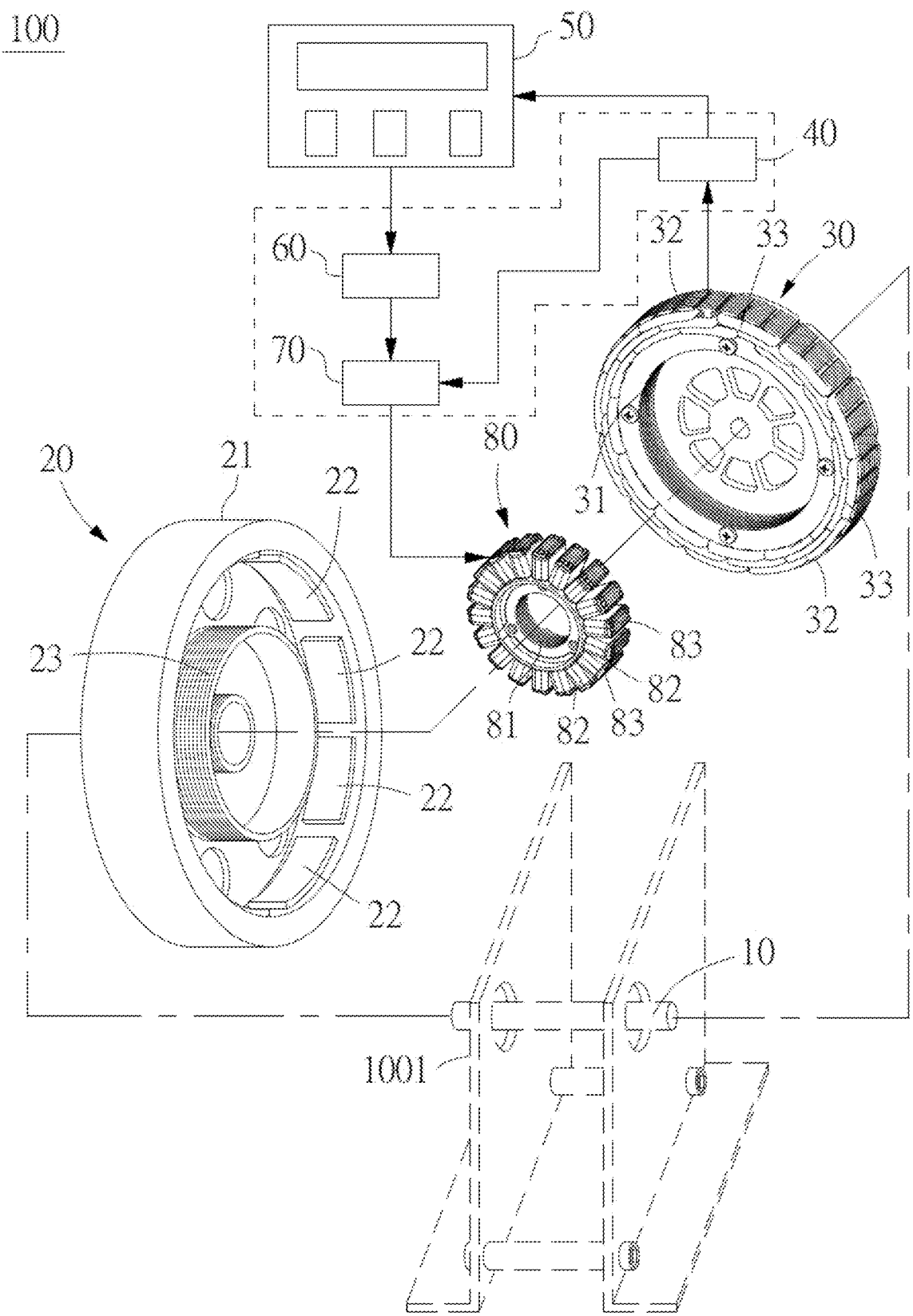
FIG. 2 is a schematic view of an electric power generation and brake device in accordance with an aspect.
Figure 3:
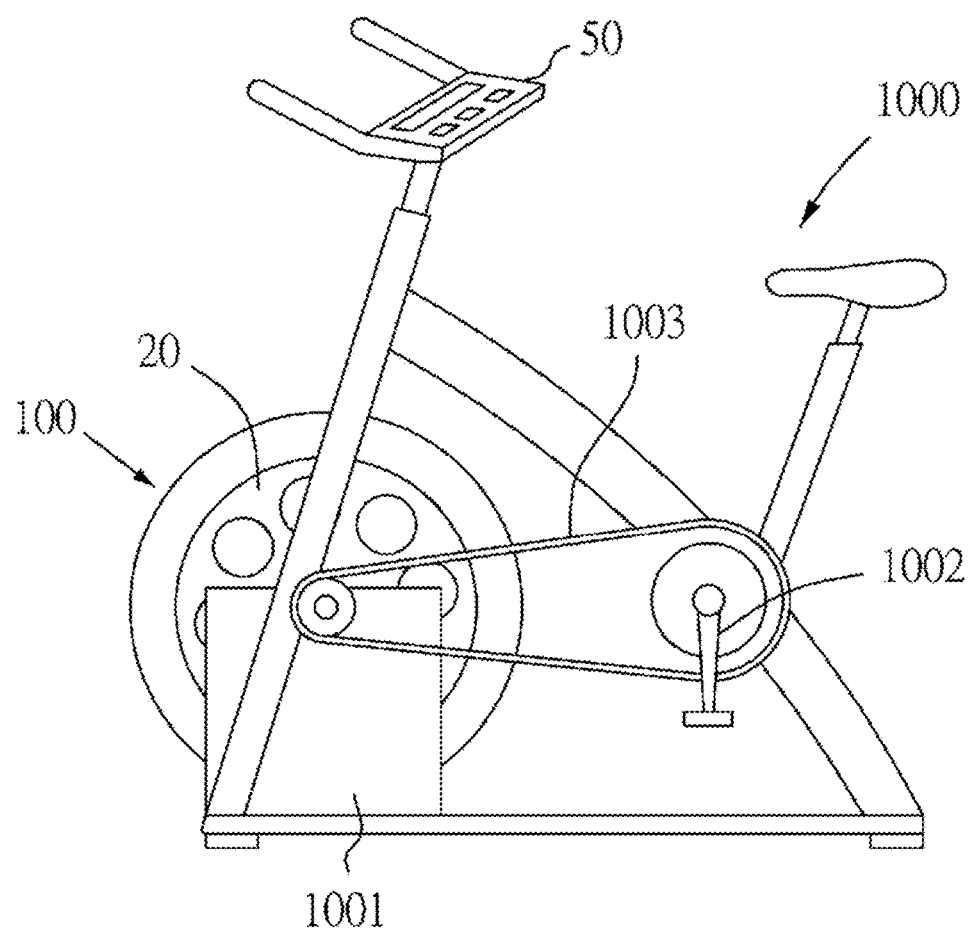
FIG. 3 is a schematic view of an electric power generation and brake device installed to a pedal fitness equipment.
Figure 4:
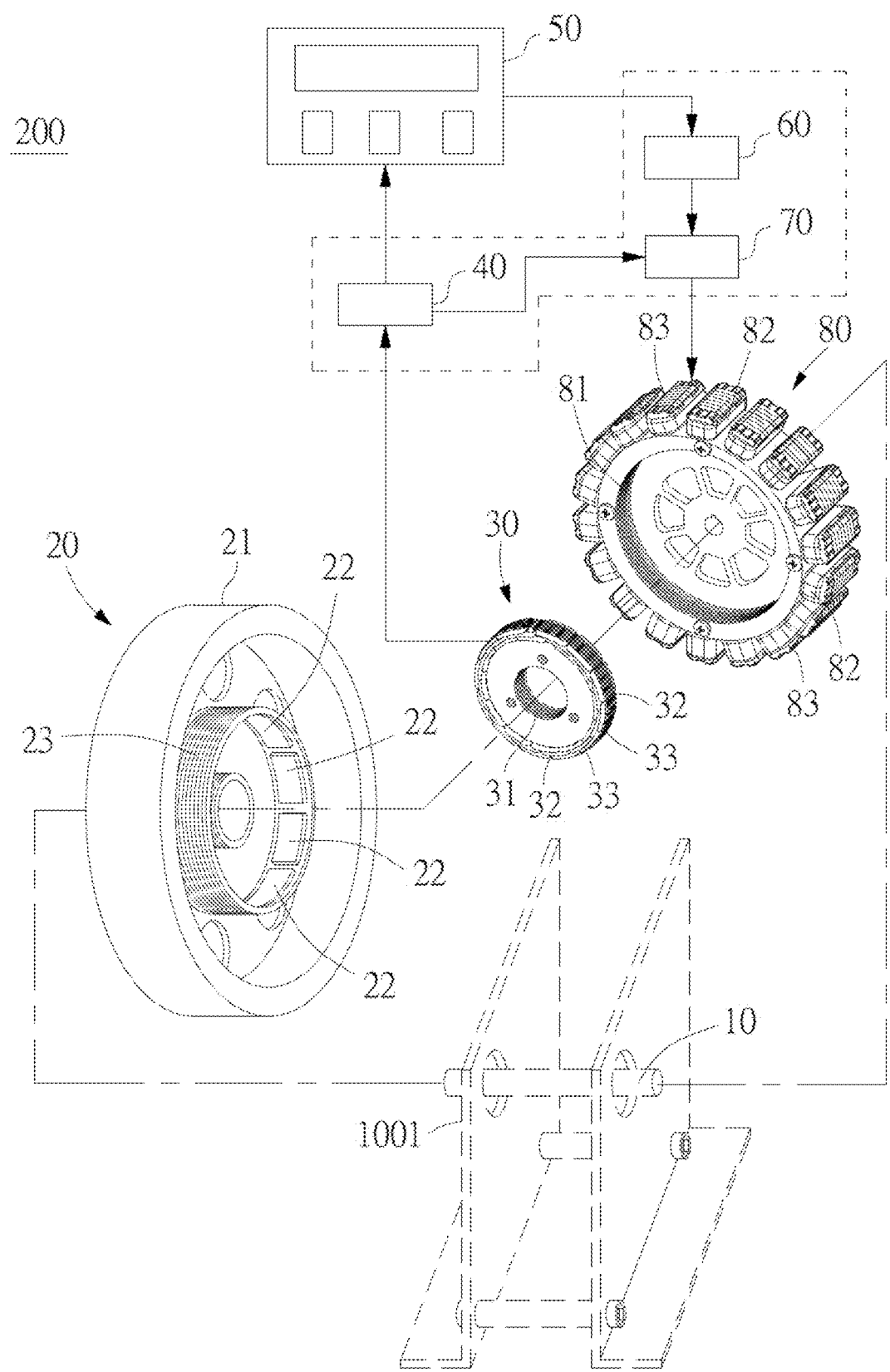
FIG. 4 is a schematic view of an electric power generation and brake device in accordance with another aspect.

With reference to FIG. 2 for a schematic view of an electric power generation and brake device 100 and reference to FIG. 4 for a schematic view of an electric power generation and brake device 200, the electric power generation and brake device 100 comprises a shaft 10, a wheel 20, a stator unit 30, a rectifier unit 40, a control panel 50, a waveform generator unit 60, a DC power regulator unit 70 and a brake unit 80. In an embodiment, the electric power generation and brake device 100 is installed to a pedal fitness equipment 1000 (as shown in FIG. 3). It is noteworthy that the electric power generation and brake device 100 may also be installed to other assemblies.

In FIGS. 2 and 3, the shaft 10 is axially installed to a base 1001 of the pedal fitness equipment 1000.

The wheel 20 is movably and axially installed to the shaft 10, and the wheel 20 comprises an outer ring 21, a plurality of permanent magnets 22 and an inner ring 23. The outer ring 21 is disposed around the edge (rim 320A) of the wheel 20, and the permanent magnets 22 are spaced with each other and disposed on one surface of the outer ring 21 facing towards the axis of the wheel 20. The inner ring 23 and the outer ring 21 are coaxially installed to the wheel 20, and the inner ring 23 is disposed between the outer ring 21 and the axis of the wheel 20.

In FIG. 2, the stator unit 30 is fixed to the shaft 10 by using the axis of the wheel 20 as the center, and the stator unit 30 comprises a stator body 31, a plurality of first serrated portions 32 and a plurality of electric generating coils 33. The stator body 31 is disposed between the outer ring 21 and the inner ring 23 of the wheel 20, and the first serrated portions 32 are disposed around an outer peripheral surface of the stator body 31, and the first serrated portions 32 are configured to be corresponsive to the permanent magnets 22 respectively. The electric generating coils 33 are wound around the first serrated portions 32. When the wheel 20 rotates, the permanent magnets 22 rotate with respect to the stator unit 30 to generate an alternating current.

As shown in FIG. 2, both of the outer ring 21 and the inner ring 23 are formed from extending the body of the wheel 20, and the first serrated portions 32 are accommodated between the outer ring 21 and the inner ring 23. Furthermore, the wheel 20 comprises a plurality of through holes 24 between the outer ring 21 and the inner ring 23 that correspond to the electric generating coils 33, for accelerating the heat dissipation.

Moreover, as shown in FIG. 2, the stator body 31 is provided with a plurality of through holes 34 between the axis and the first serrated portions 32. In addition, the through holes 34 of the stator body 31 are configured to correspond to the brake coils 83 while the brake unit 80 and the stator body 31 are assembled.

The rectifier unit 40 is electrically coupled to the stator unit 30 for converting the alternating current into a direct current. The control panel 50 is electrically coupled to the rectifier unit 40 and provided for a user to make an external operation to control the pedal fitness equipment 1000. The waveform generator unit 60 is electrically coupled to the control panel 50 for generating an inverted torque input signal according to the receiving direct current from the control panel 50 under the condition of the external operation. The DC power regulator unit 70 is electrically coupled to the waveform generator unit 60. The DC power regulator unit 70 receives the direct current from the control panel 50 under the condition of the external operation passed by the waveform generator unit 60 and receives the inverted torque input signal. The DC power regulator unit 70 further electrically connected to the brake coils 83 of the brake unit 80 to transmit the direct current and the inverted torque input signal to the brake coils 83. The rectifier unit 40, the waveform generator unit 60 and the DC power regulator unit 70 may be integrated as a controller module.

In FIG. 2, the brake unit 80 is fixed to the stator body 31 by using the axis of the wheel 20 as the center, and the brake unit 80 is electrically coupled to the DC power regulator unit 70 for receiving the direct current and the inverted torque input signal. The brake unit 80 comprises a brake body 81, a plurality of second serrated portions 82 and a plurality of brake coils 83. The brake body 81 is disposed between the inner ring 23 of the wheel 20 and the axis of the wheel 20. The second serrated portions 82 are disposed around an outer peripheral surface of the brake body 81 and facing the inner ring 23, and the second serrated portions 82 are also configured to be corresponsive to the inner ring 23 of the wheel 20. The brake coils 83 are wound around the second serrated portions 82 respectively. After the brake unit 80 receives the direct current and the inverted torque input signal, a reverse torque (which is a force in the tangential direction) and an electromagnetic attraction force (which is a force in the radial direction) are generated to brake the wheel 20. It is noteworthy that the reverse torque is a force mainly used for braking the wheel 20 and the electromagnetic attraction force is a force mainly uses for assisting to brake the wheel 20. In addition, the brake unit 80 may be fixed to the shaft 10 (which is not shown in the figures).

A user may step on a pedal unit 1002 (such as a pedal) of the pedal fitness equipment 1000 to drive the wheel 20 to rotate by a driving member 1003 (such as a belt), while the stator unit 30 and the brake unit 80 are remaining still.

When the wheel 20 is driven by the driving member 1003 to rotate, the permanent magnets 22 of the wheel 20 have effects on the first serrated portions 32 of the stator unit 30 and the electric generating coils 33 to generate the alternating current. The alternating current is transmitted to the rectifier unit 40 through an electric wire. The rectifier unit 40 converts the alternating current into the direct current. The direct current is transmitted to the control panel 50 and the DC power regulator unit 70 through an electric wire and the electric power is supplied to the control panel 50, so that the user may operate the control panel 50 to generate a control signal. The control signal transmitted from the control panel 50 is further transmitted to the waveform generator unit 60 through an electric wire to generate an inverted torque input signal. The inverted torque input signal generated from the waveform generator unit 60 and the direct current transmitted to the waveform generator unit 60 are further transmitted to the DC power regulator unit 70 through an electric wire, and then a regulatory direct current regulated by the DC power regulator unit 70 under the inverted torque input signal is transmitted to the brake unit 80. Thus, the brake unit 80 generates a reverse torque and an electromagnetic attraction force.

With reference to FIG. 4 for a schematic view of an electric power generation and brake device 200, the electric power generation and brake device 200 includes the same components as those of the electric power generation and brake device 100, except that the configuration and relation of the wheel 20.

Wherein, the electric power generation and brake device 200 comprises a shaft 10, a wheel 20, a stator unit 30, a rectifier unit 40, a control panel 50, a waveform generator unit 60, a DC power regulator unit 70 and a brake unit 80. The shaft 10 is axially installed to a base 1001 of the pedal fitness equipment.

The wheel 20 is movably and axially installed to the shaft 10, and the wheel 20 comprises an outer ring 21, a plurality of permanent magnets 22 and an inner ring 23. The outer ring 21 is disposed around the edge (rim 320A) of the wheel 20. The inner ring 23 and the outer ring 21 are coaxially installed to the wheel 20, and disposed between the outer ring 21 and the axis of the wheel 20. The permanent magnets 22 are spaced with each other and disposed on a side of the inner ring 22 facing towards the axis of the wheel 20.

Figure 5:
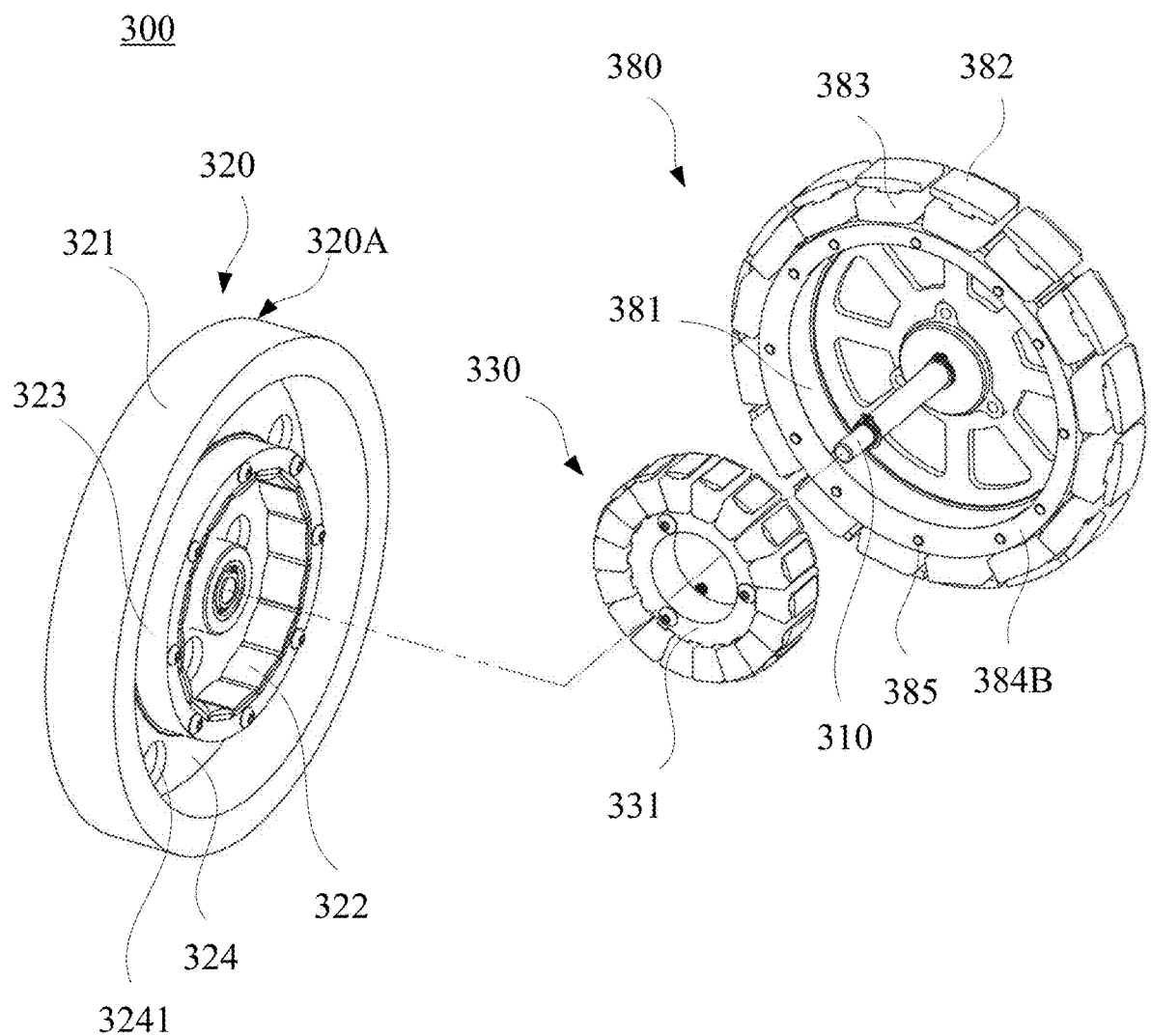
FIG. 5 is an exploded view of the electric power generation and brake device according to the first embodiment of the present disclosure.
Figure 6:
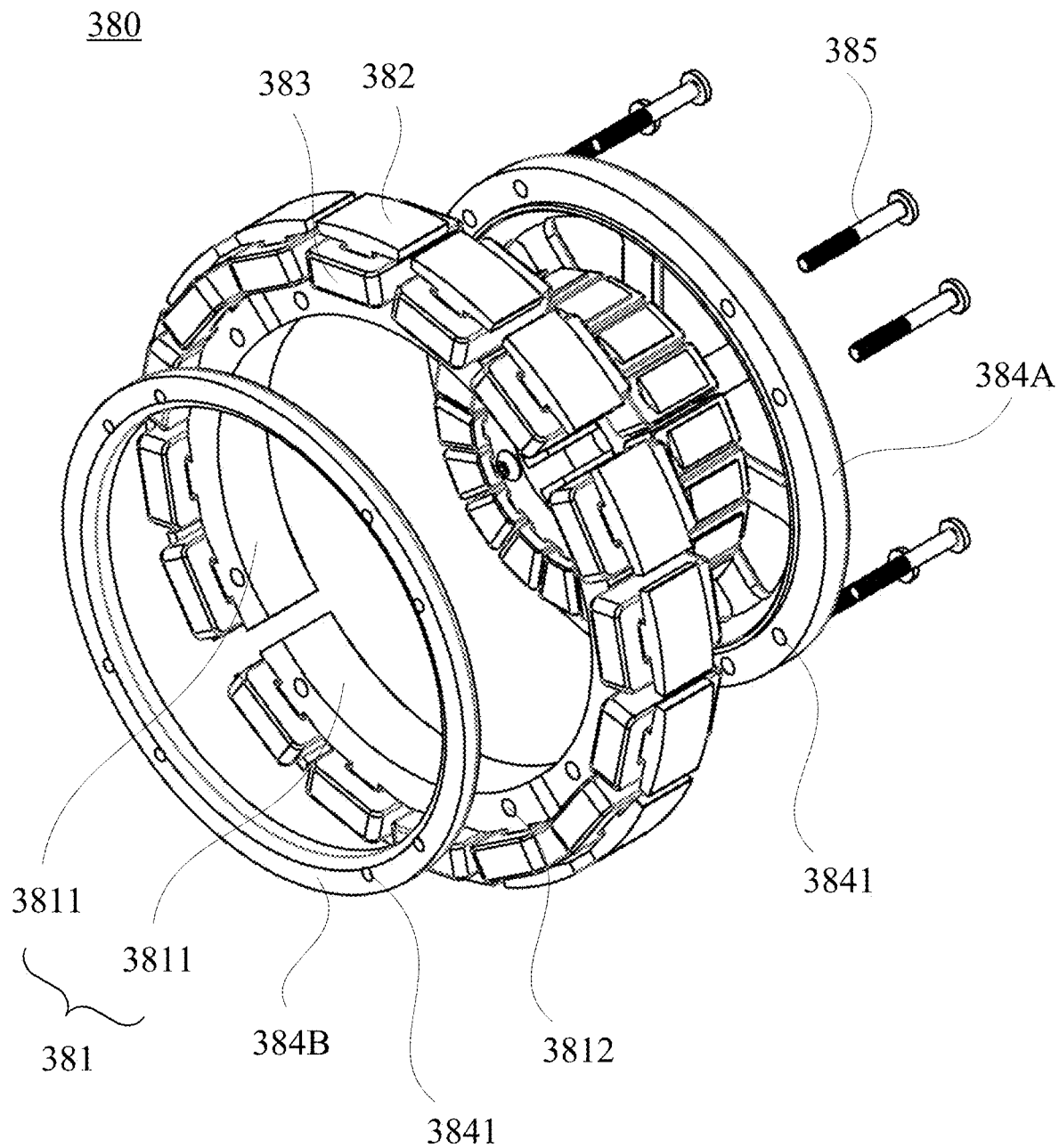
FIG. 6 is a schematic view of the brake unit shown in FIG. 5.

Referring to FIG. 5 and FIG. 6, FIG. 5 is an exploded view of the electric power generation and brake device 300 according to the first embodiment of the present disclosure, and FIG. 6 is a schematic view of the brake unit shown in FIG. 5.

The brake unit 380 in this embodiment comprises a brake body 381, a plurality of second serrated portions 382 and a plurality of brake coils 383, as shown in FIG. 5. The brake unit 380 is rotatably disposed on a wheel 320 rotatably disposed on a shaft 310 to effectuate braking. The wheel 320 comprises a protruding ring structure extending axially and being concentric with the shaft 310. For instance, the protruding ring structure extends axially from a chassis 324 of the wheel 320 and corresponds in position to an outer annular portion 321 at the periphery of the chassis 324. The brake coils 383 not only correspond in position to the outer annular portion 321 but also correspond in position to an inner annular portion 323 extending axially from the chassis 324 of the wheel 320, being closer to the shaft 310 than the outer annular portion 321, and being concentric with the shaft 310.

Referring to FIG. 5, the second serrated portions 382 are disposed circumferentially on the outer circumferential surface of the brake body 381 and protrude radially outward, whereas the brake coils 383 are each wound around the second serrated portions 382. After the brake coils 383 have received direct current, the brake coils 383 generate a magnetic field because of electromagnetic effect. When the wheel 320 rotates relative to the shaft 310, the magnetic field generated by the brake unit 380 causes the rotating wheel 320 to produce an induced electromotive force, thereby generating an eddy current. When the wheel 320 keeps rotating under an external driving force, the eddy current on the wheel 320 creates an opposite force (in the tangential direction) in the magnetic field such that the rotating wheel 320 slows down, thereby effectuating braking. Electric current is passed through the brake coils 383 such that the brake unit 380 produces an electromagnetic hysteresis resistance. Under the electromagnetic hysteresis resistance, the rotating wheel 320 slows down, thereby providing the resistance required for braking the rotation of the wheel 320.

The brake body 381 comprises a plurality of brake blocks 3811 arranged in a circle, as shown in FIG. 6. The brake blocks 3811 are in the number of four, but the present disclosure is not limited thereto. In this embodiment, with the brake body 381 being composed of brake blocks 3811, the position of each brake block 3811 is variable such that the position of each brake block 3811 relative to the shaft 310 is adjustable, thereby rendering it feasible to adjust the size of the electromagnetic air gap formed between the brake unit 380 and the protruding ring structure.

Referring to FIG. 6, the brake unit 380 comprises a plurality of coupling elements 385 and a frame. The frame in this embodiment has a sub-frame 384A and a sub-frame 384B. The sub-frames 384A, 384B each have a plurality of coupling holes 3841. The brake blocks 3811 each have a plurality of limiting holes 3812 corresponding in position to the coupling holes 3841, respectively. The limiting holes 3812 define allowable displacements of the brake blocks 3811 relative to the shaft 310, respectively. The coupling elements 3841 are coupled to the coupling holes 3841 through the limiting holes 3812, respectively, such that the brake blocks 3811 thus displaced are fixed in place.

For instance, the coupling elements 385 are screws. The brake blocks 3811 are fastened to the coupling holes 3841 by the coupling elements 385, respectively, and thereby confined to specific points on the sub-frames 384A, 384B. Preferably, the diameter of the limiting holes 3812 of the brake blocks 3811 is slightly larger than the diameter of the coupling holes 3841 and the outer diameter of the coupling elements 385; hence, the position of each brake block 3811 relative to the shaft 310 such that the size of the electromagnetic air gap formed between the brake unit 380 and the protruding ring structure can be fine-tuned. For instance, the coupling elements 385 are each coupled to the frame (i.e., the sub-frames 384A, 384B) by screwing, but the limiting holes 3812 on the brake blocks 3811 are not coupled to the coupling elements 385, respectively, by screwing.

For the sake of illustration, the outer diameter of each coupling element 385 is denoted by a, the tolerance of the size of the electromagnetic air gap by b, and the diameter of each limiting hole 3812 by a+b*2. For the sake of illustration, the coupling elements 385 are exemplified by M5 screws with an outer diameter of 5 mm. If the expected adjustable range of the electromagnetic air gap is set to +/−0.1 mm, it will be feasible to set the diameter of the limiting holes 3812 to just 5.2 mm. For instance, preferably, after the coupling elements 385 have been penetratingly disposed at the limiting holes 3812, respectively, the coupling elements 385 take up, axially, a maximum 97% of the space of the limiting holes 3812 (see FIG. 8(b)).

Figure 1:
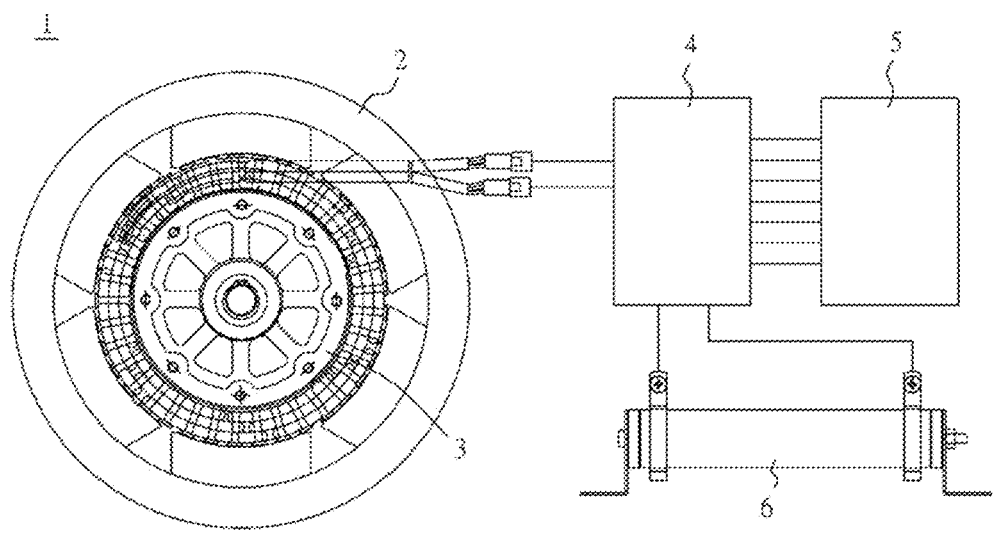
FIG. 1 is a schematic view of a conventional power generating device.

In this embodiment, the stator unit 330 is disposed within the inner periphery of the brake unit 380. Referring to FIG. 5, the brake body 381 of the brake unit 380 is disposed between the outer annular portion 321 and the inner annular portion 323, whereas the stator body 331 of the stator unit 330 is disposed between the inner annular portion 323 and the shaft 310 and faces the permanent magnets 322 disposed on the inner surface of the inner annular portion 323. Optionally, the brake body 381 has a plurality of brake blocks 3811, whereas the brake unit 380 is disposed within the inner periphery of the stator unit 330 as shown in FIG. 1. The brake coils 383 correspond in position to either the outer annular portion 321 or the inner annular portion 323.

In this embodiment, the sub-frames 384A and the sub-frames 384B are disposed on two opposing sides of the brake body 381, respectively, to limit and fix the positions of the brake blocks 3811 of the brake body 381. However, this embodiment and FIG. bare not restrictive of the structural features of the coupling elements 385 and the sub-frames 384A, 384B.

Figure 7:
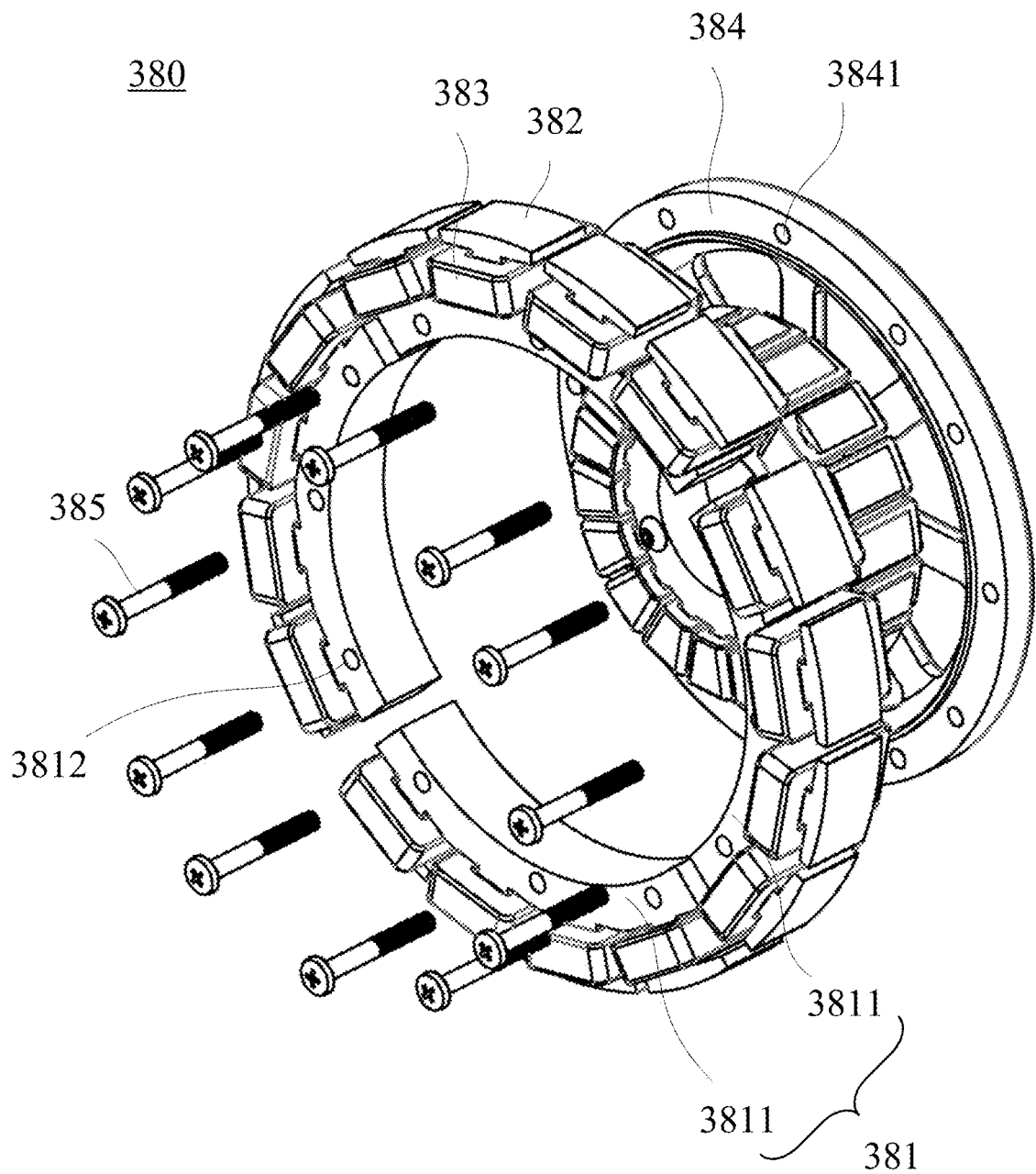
FIG. 7 is an exploded view of the brake unit according to another aspect of the first embodiment of the present disclosure.

Referring to FIG. 7, in another embodiment, the coupling elements 385 are screws with screw heads and are coupled to the frame 384 in a screwing direction opposite to that shown in FIG. 6 such that the brake blocks 3811 are clamped and fixed in place by the screw heads of the screws and the frame 384, thereby allowing the brake blocks 3811 to be arranged in a circle to form the ring-shaped brake body 381.

Regarding the device for use in generating electric power and braking (see FIG. 5) in this embodiment, the bottom surface 324 of the wheel 320 has a plurality of through holes 3241 from which ends of the coupling elements 385 are exposed, respectively. After the brake blocks 3811 shown in FIG. 7 have been mounted in place, the coupling elements 385 are fastened in place through the through holes 3241.

Figure 8A:
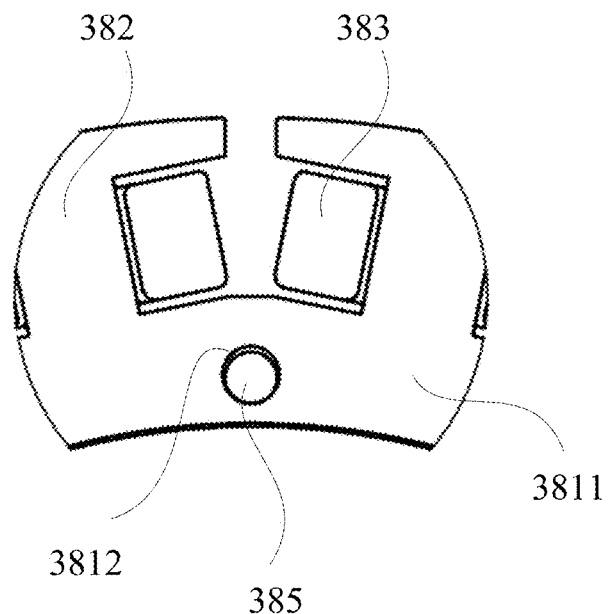
FIG. 8(a) is a schematic view showing the smallest electromagnetic air gap between the brake unit and the inner wall of the protruding ring structure.
Figure 8B:
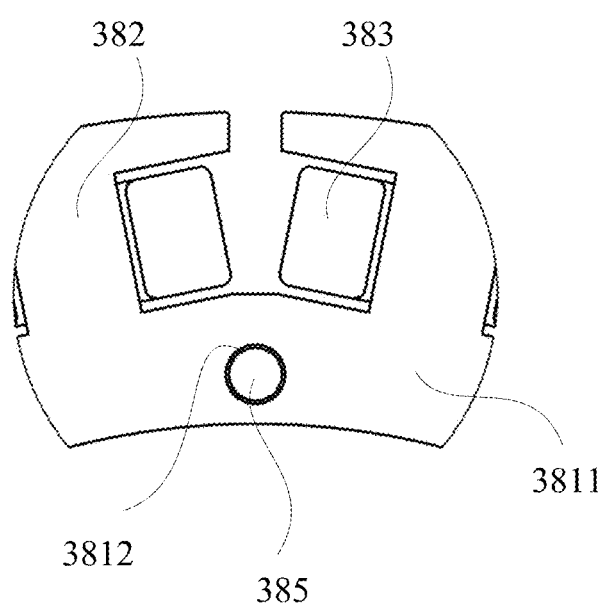
FIG. 8(b) is a schematic view showing the moderate electromagnetic air gap between the brake unit and the inner wall of the protruding ring structure.
Figure 8C:
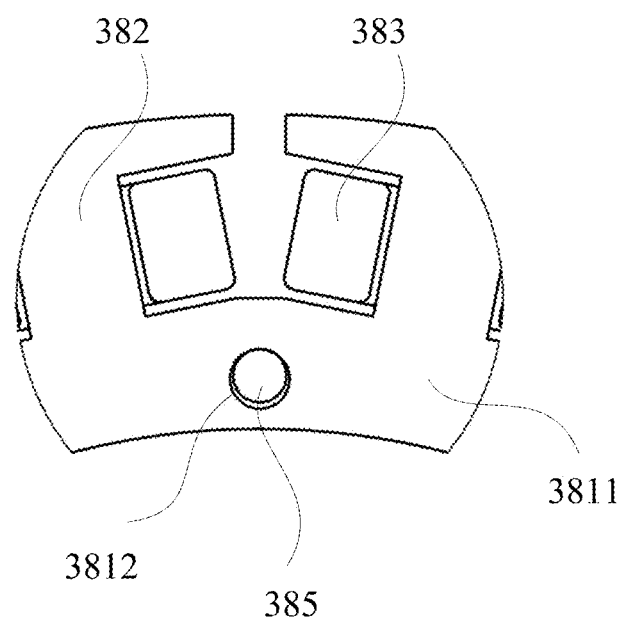
FIG. 8(c) is a schematic view showing the largest electromagnetic air gap between the brake unit and the inner wall of the protruding ring structure.

Referring to FIG. 8(a) through FIG. 8(c), the range of the electromagnetic air gap is adjustable. FIG. 8(a) is a schematic view showing that the coupling element 385 is located at the bottom of the limiting hole 3812 to achieve the smallest electromagnetic air gap between the brake unit 380 and the inner wall of the protruding ring structure (the outer annular portion 321). FIG. 8(b) is a schematic view showing that the coupling element 385 is located at the center of the limiting hole 3812 to achieve the moderate electromagnetic air gap between the brake unit 380 and the inner wall of the protruding ring structure (the outer annular portion 321). FIG. 8(c) is a schematic view showing that the coupling element 385 is located at the top of the limiting hole 3812 to achieve the largest electromagnetic air gap between the brake unit 380 and the inner wall of the protruding ring structure (the outer annular portion 321). With the brake blocks 3811 being clamped by the coupling elements 385 and the sub-frames 384A, 384B, the electromagnetic air gap between the brake unit 380 and the protruding ring structure attains the required resistance precision.

Figure 9:
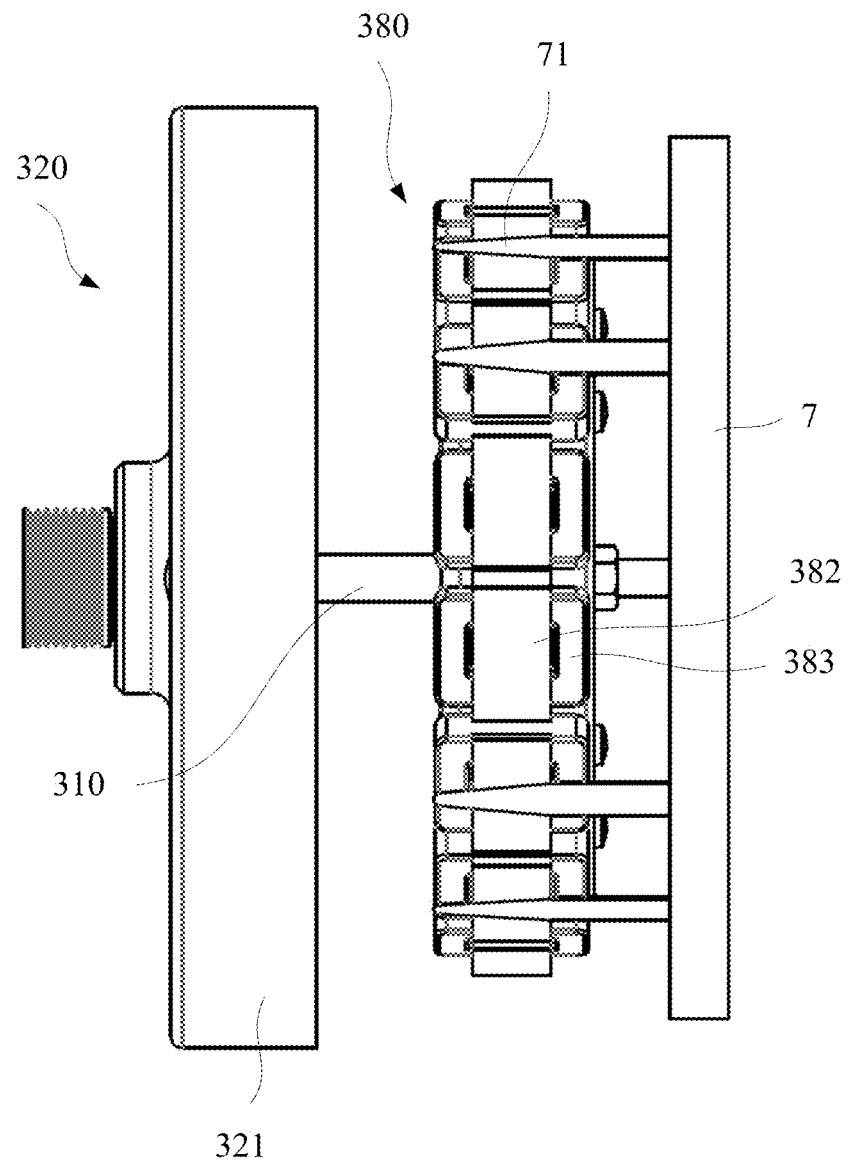
FIG. 9 is a partial exploded view of the gap control jig and the electric power generation and brake device in an assembly method according to this embodiment.
Figure 10:
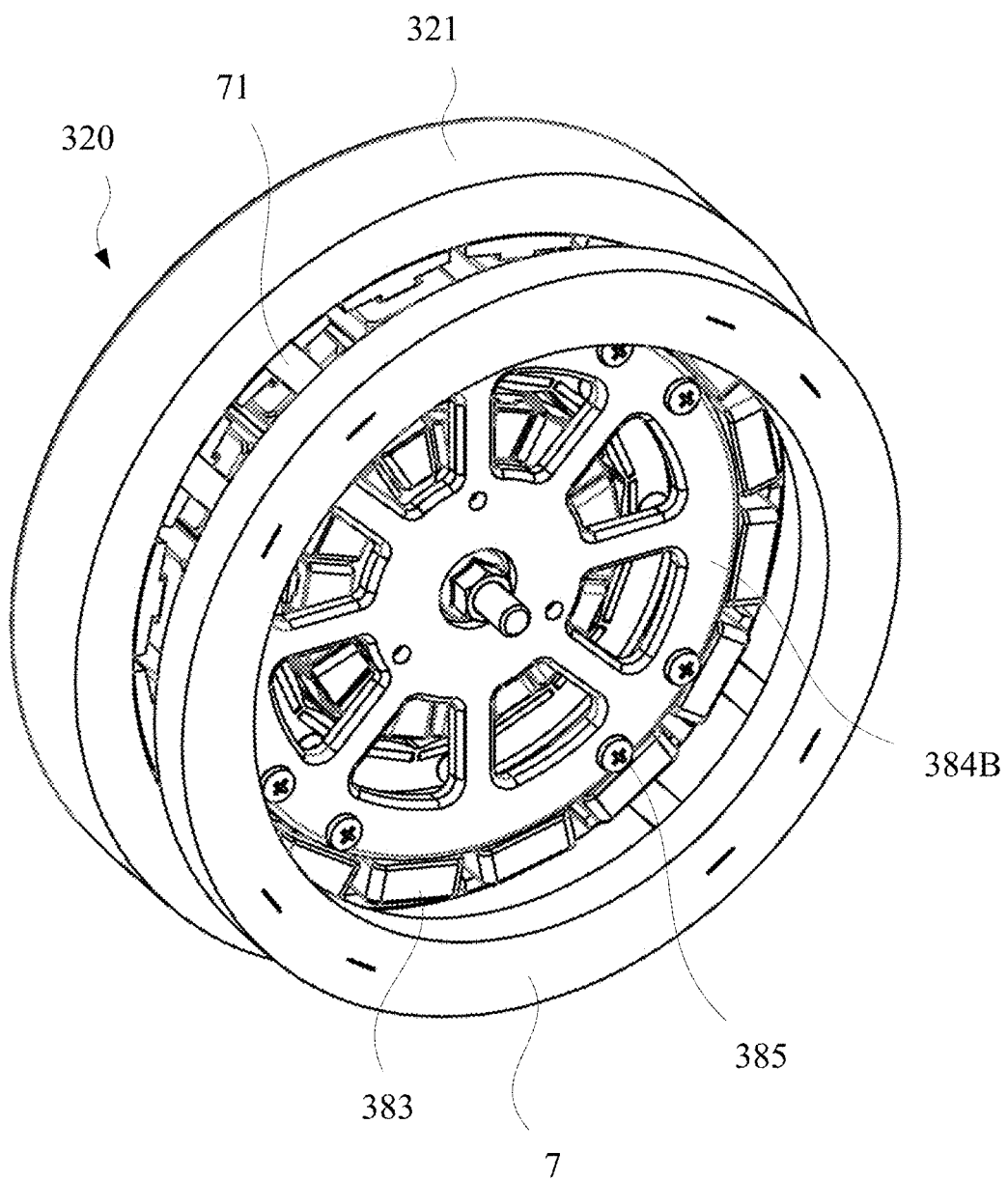
FIG. 10 is a schematic view of the gap control jig and the electric power generation and brake device in an assembly method according to this embodiment.

Referring to FIG. 9 and FIG. 10, FIG. 9 is a partial exploded view of the gap control jig and the electric power generation and brake device in an assembly method according to this embodiment, whereas FIG. 10 is a schematic view of the gap control jig and the electric power generation and brake device in an assembly method according to this embodiment. Described below is an assembly method, in this embodiment, the brake unit 380 is assembled and mounted on the electric power generation and brake device such that the electromagnetic air gap attains high-precision control, thereby enhancing resistance precision.

The assembly method comprises the steps of:

(1) Providing a shaft 310, a wheel 320 and a brake unit 380: the brake unit 380 comprises a brake body 381, a plurality of second serrated portions 382 and a plurality of brake coils 383; the brake body 381 comprises a plurality of brake blocks 3811 (see FIG. 6); the second serrated portions 382 are circumferentially disposed on the outer circumferential surface of the brake body 381 and protrude radially outward; the brake coils 383 are each wound around the second serrated portions 382; the wheel 320 comprises a protruding ring structure extending axially and being concentric with the shaft 310 (exemplified by the outer annular portion 321 shown in the diagrams);

(2) Inserting a gap control jig 7 between the wheel 320 and the brake unit 380: the gap control jig 7 comprises a plurality of extending plates 71 extending axially and inserted between the brake body 381 and the protruding ring structure (the outer annular portion 321);

(3) Passing electric current through the brake coils 383 of the brake unit 380 to generate a magnetic force such that the wheel 320, the brake unit 380 and the gap control jig 7 are coupled together temporarily under the magnetic force;

(4) Fastening a plurality of coupling elements 385 coupled to the wheel 320 and the brake unit 380 such that the brake blocks 3811 are arranged in a circle, and forming an electromagnetic air gap between the wheel 320 and the brake unit 380;

(5) Stopping supplying power to the brake coils 383 of the brake unit 380; and (6) Removing the gap control jig 7.

Therefore, the assembly method in this embodiment has advantageous technical features as follows: the extending plates 71 of the gap control jig 7 are inserted between the brake body 381 and the protruding ring structure (the outer annular portion 321); as soon as electric current is passed through the brake coils 383 of the brake unit 380 to generate a magnetic force, the brake blocks 3811 not fastened in place by the coupling elements 385 are capable of automatically adjusting their distance from the protruding ring structure (the outer annular portion 321) under the magnetic force, and the extending plates 71 provide a position-limiting effect; the brake blocks 3811 are arranged in a circle to therefore form the ring-shaped brake body 381; an electromagnetic air gap between the wheel 320 and the brake unit 380 is defined to therefore attain a target size upon fastening the brake unit 380 in place by the coupling elements 385, interruption of passage of electric current through the brake coils 383, and removal of the gap control jig 7.

In this embodiment, the extending plates 71 correspond in position to the limiting holes of the brake body.

Therefore, the thickness of the extending plates 71 of the gap control jig 7 is substantially equal to the width of the electromagnetic air gap, whereas the processing precision of the extending plates 71 of the gap control jig 7 correlates with the precision control of the electromagnetic air gap. Hence, the target size of the electromagnetic air gap is defined by the thickness of the extending plates 71 of the gap control jig 7.

Figure 11:
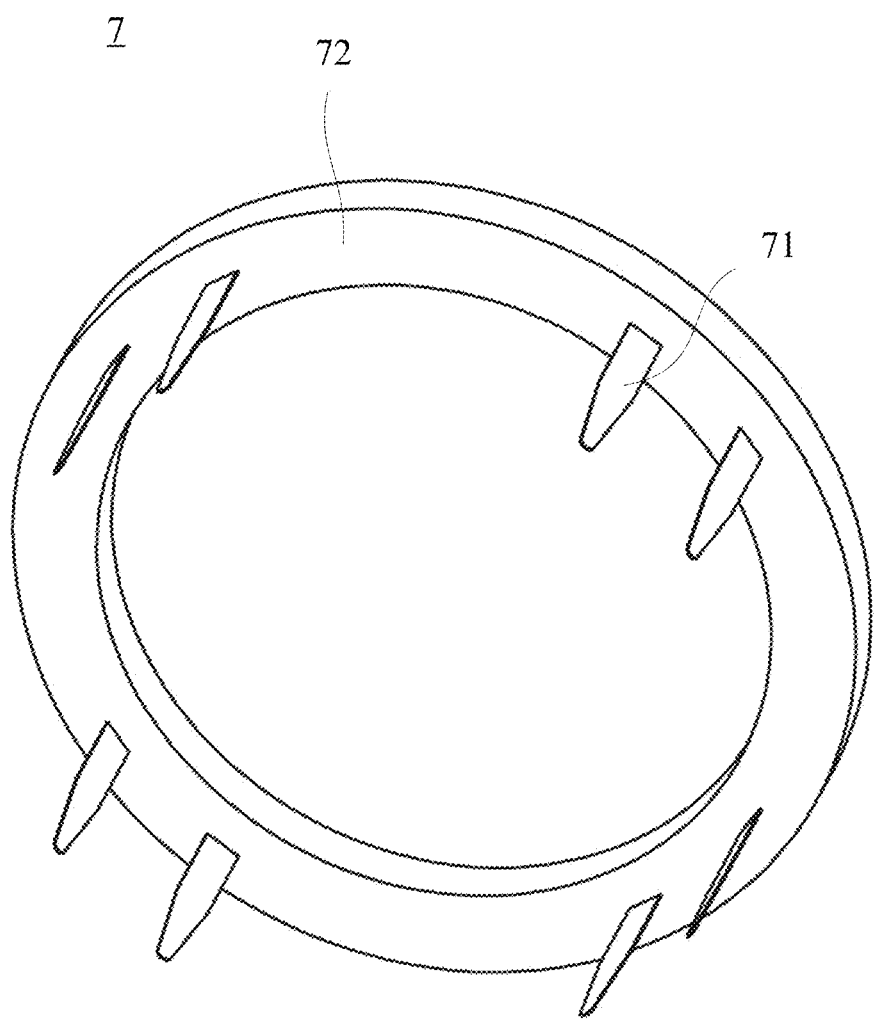
FIG. 11 is a schematic view of the gap control jig according to this embodiment.

Referring to FIG. 11, FIG. 11 is a schematic view of the gap control jig according to this embodiment. The gap control jig 7 comprises an annular support 72 and the extending plates 71 extending axially from a surface of the annular support 72. Considering that the gap control jig 7 is more structurally simple than the brake unit 380, the high precision of the electromagnetic air gap can be achieved by the assembly method and the brake unit in this embodiment to thereby enhance resistance precision, provided that the processing precision of the extending plates 71 of the gap control jig 7 is sufficiently high.

Figure 12:
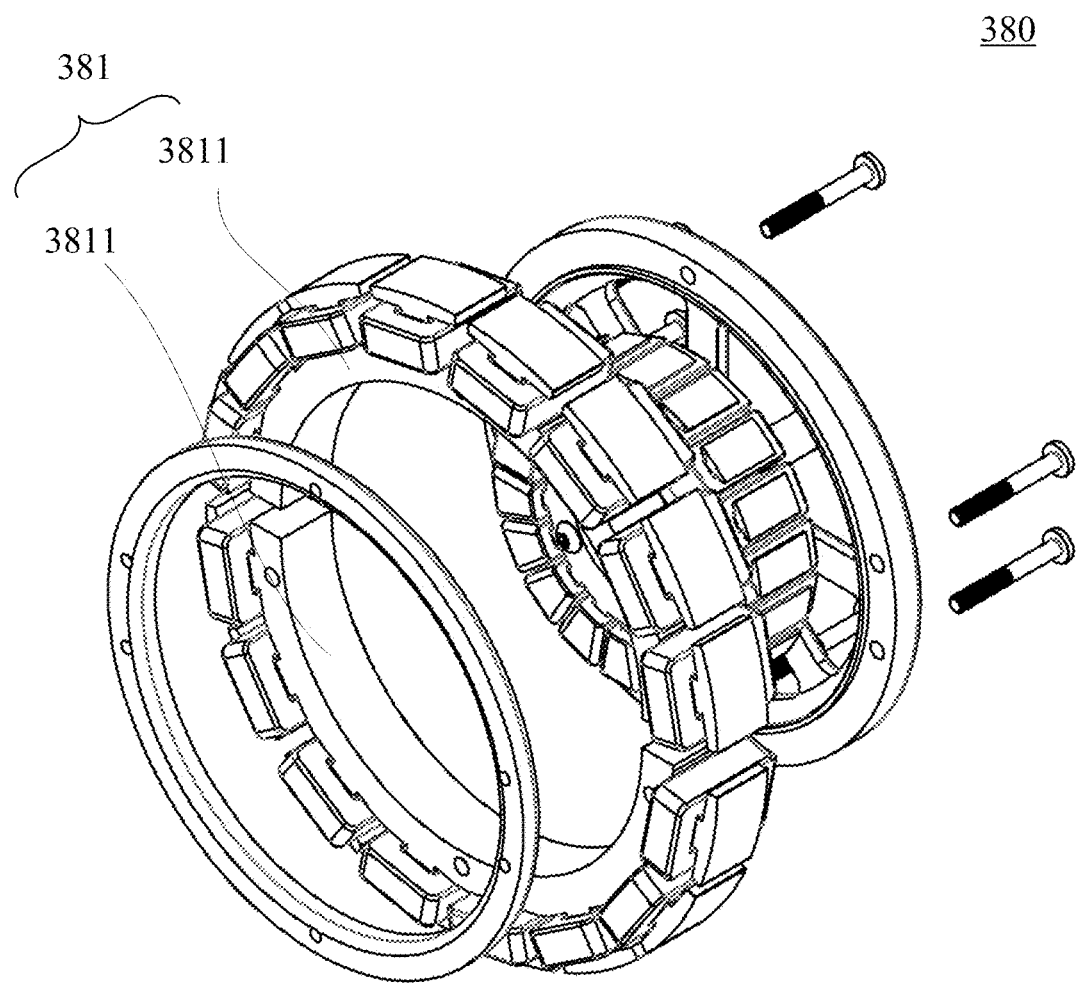
FIG. 12 is a schematic view of the brake body comprising two brake blocks.
Figure 13:
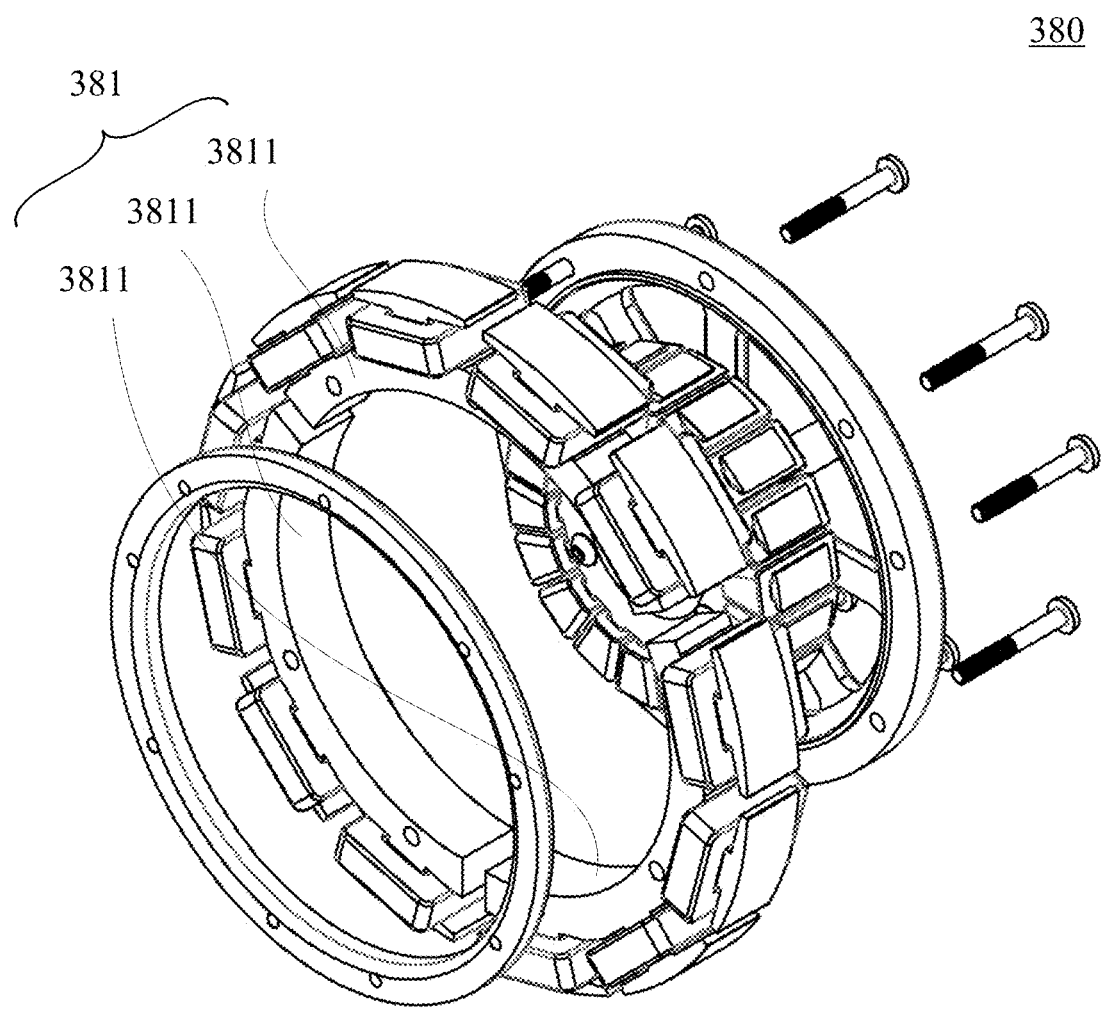
FIG. 13 is a schematic view of the brake body comprising three brake blocks.

Although diagrams for the aforesaid embodiment show that the brake body 381 comprises four brake blocks 3811, the present disclosure is not limited thereto; hence, the brake body 381 comprises at least two brake blocks 3811 as needed. Referring to FIG. 12 and FIG. 13, FIG. 12 is a schematic view of the brake body 381 comprising two brake blocks 3811, whereas FIG. 13 is a schematic view of the brake body 381 comprising three brake blocks 3811. Regarding the tolerance of the size of the electromagnetic air gap, the more the brake blocks 3811 constitute the brake body 381, the smaller is the tolerance of the size of the electromagnetic air gap, albeit at the cost of rendering the assembly process complicated. Preferably, the second serrated portions 382 corresponding in position to each brake block 381 are in the number of at least two such that judgment of the direction of the winding of the brake coils 383 is neither intricate nor susceptible to errors.

The brake blocks 3811 extend arcuately and have equal central angles. For example, the sum of the central angles of the brake blocks 3811 equals 360 degrees, and thus the brake blocks 3811 are arranged to form the ring-shaped brake body 381.

Therefore, in the aforesaid embodiments, a brake unit, an electric power generation and brake device having the brake unit, and an assembly method for the same are advantageous in that the tolerance of the size of the electromagnetic air gap between the brake unit and the wheel is made small, even without increasing the machining precision and costs of the brake unit, thereby enhancing resistance precision.

The present disclosure is illustrated by various aspects and embodiments. However, persons skilled in the art understand that the various aspects and embodiments are illustrative rather than restrictive of the scope of the present disclosure. After perusing this specification, persons skilled in the art may come up with other aspects and embodiments without departing from the scope of the present disclosure. All equivalent variations and replacements of the aspects and the embodiments must fall within the scope of the present disclosure. Therefore, the scope of the protection of rights of the present disclosure shall be defined by the appended claims.

What is claimed is:

1. A device for use in generating electric power and braking, comprising:

a rotatable wheel disposed on a shaft, the wheel comprising an outer annular portion circumferentially disposed on a rim of the wheel, an inner annular portion concentric with the outer annular portion and disposed between the outer annular portion and the shaft, and a plurality of permanent magnets disposed on an inner surface of one of the outer annular portion and the inner annular portion;

a stator unit comprising a stator body, a plurality of first serrated portions circumferentially disposed on an outer circumferential surface of the stator body and protruding radially outward, and a plurality of electric generating coils wound around the first serrated portions, wherein the first serrated portions oppose the permanent magnets; and a brake unit fixed to the stator unit and comprising a brake body concentric with the stator body, a plurality of second serrated portions circumferentially disposed on an outer circumferential surface of the brake body and protruding radially outward, and a plurality of brake coils wound around the second serrated portions, wherein the brake body comprises a plurality of brake blocks arranged in a circle;

wherein a position of each brake block relative to the shaft is adjustable, wherein the plurality of brake blocks of the brake body is held together by a plurality of coupling elements and fixed to a frame of the stator unit, the frame having a plurality of coupling holes, the plurality of brake blocks having a plurality of limiting holes corresponding in position to the plurality of coupling holes, respectively, the limiting holes defining allowable displacements of the brake blocks relative to the shaft, respectively, the coupling elements being coupled to the coupling holes through the limiting holes, respectively, such that the brake blocks thus displaced are fixed in place.

2. The device of claim 1, wherein the brake blocks extend arcuately and have equal central angles relative to the shaft.

3. The device of claim 2, wherein the number of the second serrated portions corresponding in position to each said brake block is at least two.

4. The device of claim 3, wherein the brake body of the brake unit is disposed between the outer annular portion and the inner annular portion, whereas the stator body of the stator unit is disposed between the inner annular portion and the shaft and faces the permanent magnets disposed on an inner surface of the inner annular portion.

5. The device of claim 4, wherein a bottom surface of the wheel has a plurality of through holes from which ends of the coupling elements are exposed, respectively.

6. The device of claim 3, wherein the brake body of the brake unit is disposed between the inner annular portion and the shaft, whereas the stator body of the stator unit is disposed between the outer annular portion and the inner annular portion and faces the permanent magnets disposed on an inner surface of the outer annular portion.

7. The device of claim 6, wherein a bottom surface of the wheel has a plurality of through holes from which ends of the coupling elements are exposed, respectively.

8. A brake unit, for braking a rotatable wheel disposed on a shaft, the wheel comprising a protruding ring structure extending axially and being concentric with the shaft, the brake unit comprising:
a brake body comprising a plurality of brake blocks arranged in a circle;
a plurality of second serrated portions disposed circumferentially on an outer circumferential surface of the brake body and protruding radially outward; and
a plurality of brake coils each wound around the second serrated portions;
wherein a position of each brake block relative to the shaft is adjustable,
wherein the brake unit comprises a frame and a plurality of coupling elements, the frame having a plurality of coupling holes which the plurality of coupling elements is penetratingly fixed to, respectively, the brake blocks each having a plurality of limiting holes corresponding in position to the plurality of coupling holes, respectively, such that allowable displacements of the brake blocks relative to the shaft are defined, because the coupling elements are axially fixed in place and the limiting holes have a larger diameter than that of the coupling holes.

9. The brake unit of claim 8, wherein the coupling elements are each coupled to the frame by screwing, but the limiting holes on the brake blocks are not coupled to the coupling elements, respectively, by screwing.

10. The brake unit of claim 9, wherein, after the coupling elements have been penetratingly disposed at the limiting holes, respectively, the coupling elements take up, axially, a maximum 97% of space of the limiting holes.

11. The brake unit of claim 8, wherein the brake blocks extend arcuately and have equal central angles relative to the shaft.

12. The brake unit of claim 8, wherein the number of the second serrated portions corresponding in position to each said brake block is at least two.

13. A kit for a electric power generation and brake device, comprising:
a wheel comprising a protruding ring structure extending axially and being concentric with a shaft;
a brake unit comprising a brake body, a plurality of second serrated portions circumferentially disposed on an outer circumferential surface of the brake body and protruding radially outward, and a plurality of brake coils wound around the second serrated portions, wherein the brake body comprises a plurality of brake blocks arranged in a circle by a frame and a plurality of coupling elements; and
a gap control jig comprising a plurality of extending plates extending axially and inserted between the protruding ring structure of the wheel and the brake unit, wherein the extending plates provide a position-limiting effect when the brake blocks not fastened in place by the coupling elements are capable of automatically adjusting their distance from the protruding ring structure under a magnetic force generated from the brake coils which electric current is passing through, wherein an electromagnetic air gap between the wheel and the brake unit attains a target size upon fastening the brake unit in place by the coupling elements, interruption of passage of electric current through the brake coils, and removal of the gap control jig.

14. The kit of claim 13, wherein the target size of the electromagnetic air gap is defined by a thickness of the extending plates of the gap control jig.

* * * * *